4 Sheets—Sheet 1

C. F. BRUSH.

Magneto Electric Machine.

No. 9,410. Reissued Oct. 12, 1880.

WITNESSES:

Frank M. Gabor,

W. E. Connelly.

INVENTOR

Chas F. Brush.

By Leggett & Leggett,

ATTORNEYS.

THE NORRIS PETERS CO., PHOTO-LITHO., WASHINGTON, D. C.

C. F. BRUSH.

Magneto Electric Machine.

No. 9,410. Reissued Oct. 12, 1880.

WITNESSES:

Frank M. Tabor,

W. C. Donnelly.

INVENTOR:

Chas. F. Brush,

By Leggett & Leggett,

ATTORNEYS.

THE NORRIS PETERS CO., PHOTO-LITHO., WASHINGTON, D. C.

C. F. BRUSH.

Magneto Electric Machine.

No. 9,410. Reissued Oct. 12, 1880.

WITNESSES:
Frank M. Fabor,
W. E. Donnelly.

INVENTOR:
Chas F. Brush.
By Leggett & Leggett,
ATTORNEYS.

THE NORRIS PETERS CO., PHOTO-LITHO., WASHINGTON, D. C.

C. F. BRUSH.

Magneto Electric Machine.

No. 9,410. Reissued Oct. 12, 1880.

WITNESSES:

Frank M. Fabry

W. E. Donnelly

INVENTOR:

Chas. F. Brush.

By Leggett & Leggett,

ATTORNEYS.

THE NORRIS PETERS CO., PHOTO-LITHO., WASHINGTON, D. C.

UNITED STATES PATENT OFFICE.

CHARLES F. BRUSH, OF CLEVELAND, OHIO.

MAGNETO-ELECTRIC MACHINE.

SPECIFICATION forming part of Reissued Letters Patent No. 9,410, dated October 12, 1880.

Original No. 189,997, dated April 24, 1877. Application for reissue filed April 16, 1880.

*To all whom it may concern:*

Be it known that I, CHARLES F. BRUSH, of Cleveland, in the county of Cuyahoga and State of Ohio, have invented certain new and useful Improvements in Magneto-Electric Machines; and I do hereby declare the following to be a full, clear, and exact description of the invention, such as will enable others skilled in the art to which it pertains to make and use it, reference being had to the accompanying drawings, which form part of this specification.

My invention relates to magneto-electric machines or apparatus for the conversion of mechanical into electrical energy; and it consists of improvements in the armature and in the arrangement of commutators.

Figure 1:
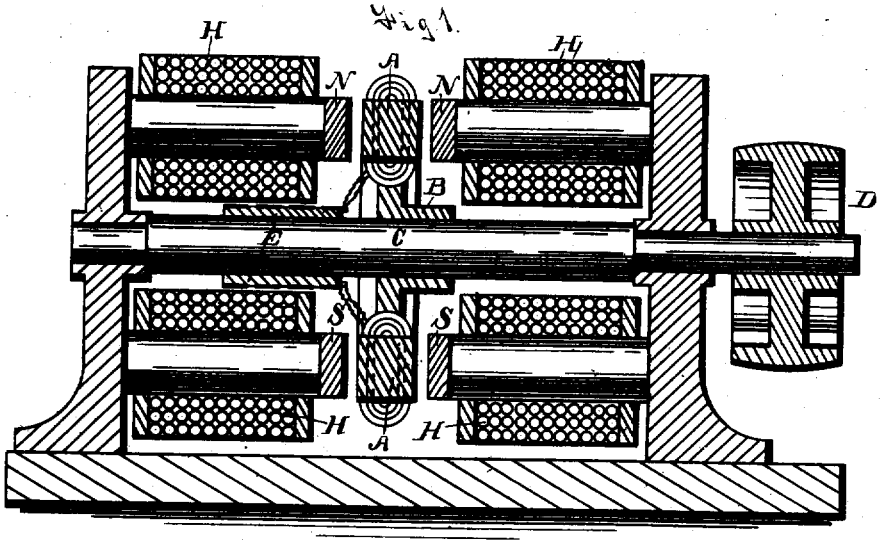
Figure 2:
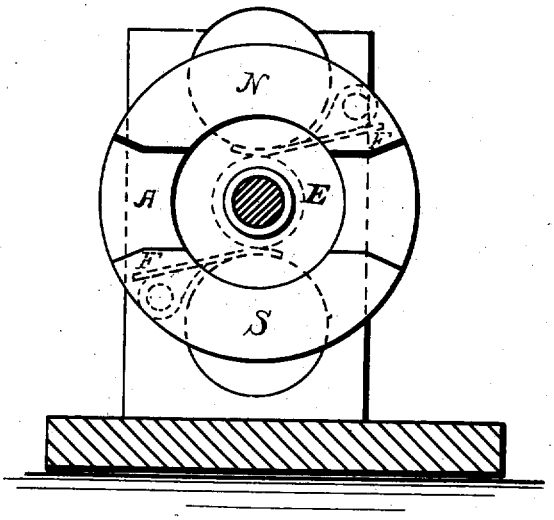
Figure 3:
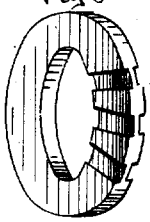
Figure 4:
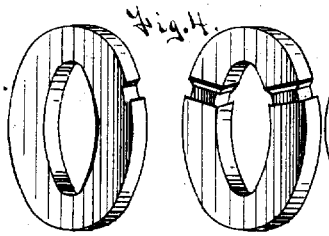
Figure 5:
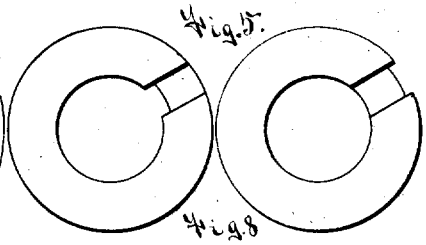
Figure 8:
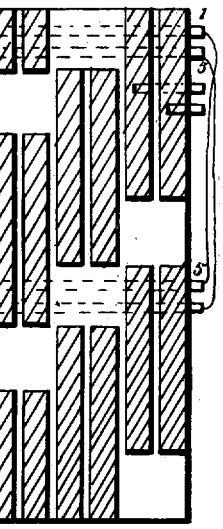
Figure 7:
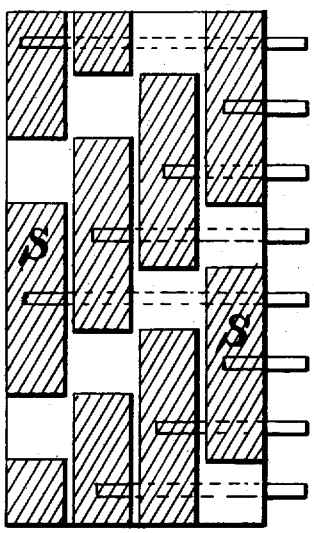
Figure 6:
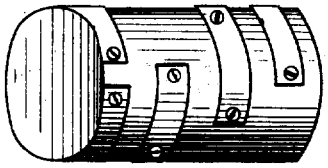
Figure 9:
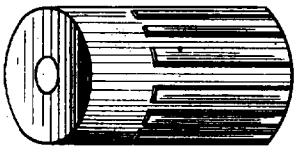
Figure 10:
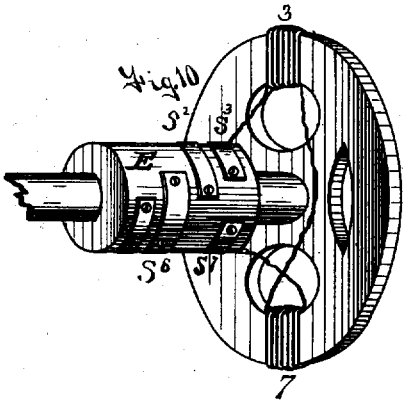
Figure 11:
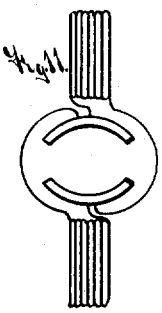
Figure 12:
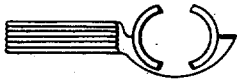
Figure 13:
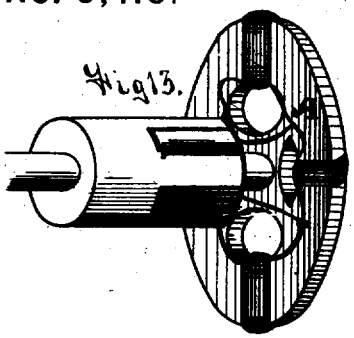
Figure 14:
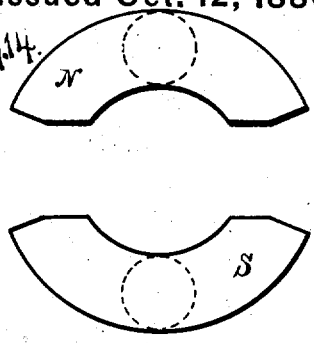
Figure 15:
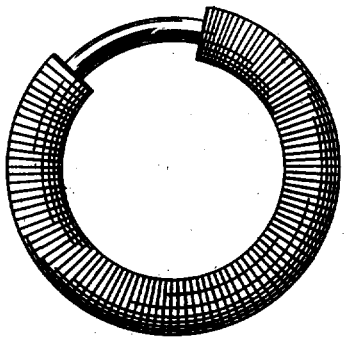
Figure 16:
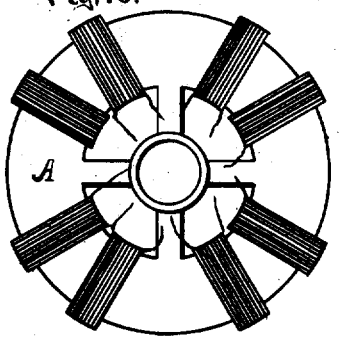
Figure 17:
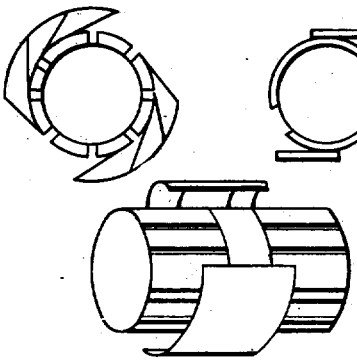
Figure 18:
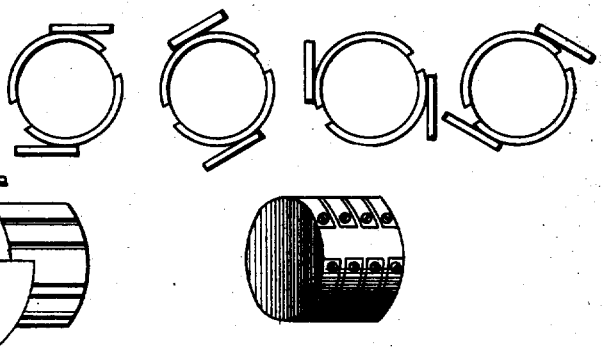
Figure 19:
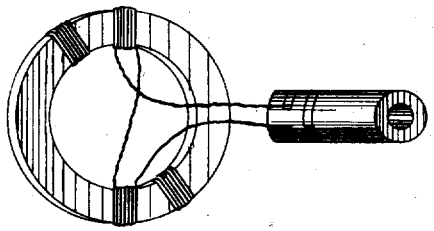
Figure 20:
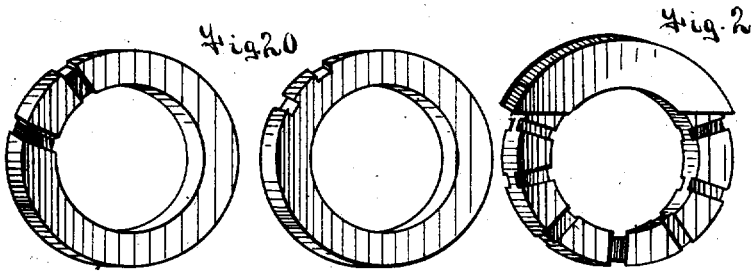
Figure 21:
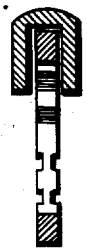

In the drawings, Figure 1 represents a vertical section, through its axis, of a convenient form of apparatus embodying my several improvements. Fig. 2 shows a vertical section, across its axis, of the same. Fig. 3 represents the armature, with grooves or depressions at right angles to its axis. Figs. 4 and 5 show four modifications of the same. Fig. 6 shows a perspective view of the commutator-cylinder complete. Fig. 7 shows the same when developed. Fig. 8 shows a developed commutator provided with double the number of segments shown in Fig. 7, used when each section of wire of the armature is connected with two opposite segments, each section provided with its own pair of segments. Fig. 9 represents a commutator wherein the strips of metal are arranged on the cylinder in a direction parallel with its axis. Fig. 10 represents a perspective view of the armature and commutator-cylinder E, both on the shaft, with the sections of wire on the armature connected with the segments of metal on said cylinder, the first or last ends of diametrically-opposite sections joined together and the remaining ends only attached to opposite segments. Fig. 11 shows two diametrically-opposite sections and segments, both detached, wherein the first and last ends of each section are connected with opposite segments. Fig. 12 represents a section and two segments, all detached, showing how the first and last ends of a section are joined to opposite segments. Fig. 13 represents a number of sections on an armature and a commutator-cylinder, the sections being connected together in a continuous series, and joined to the segments. Fig. 14 shows a side view of the magnetic pole-pieces in segmental form. Fig. 15 represents an annular armature without grooves wound with a series of sections of wire connected together in a continuous series. Fig. 16 is a plan view of the armature provided with sections of wire wound in grooves. (Shown in Fig. 3.) Fig. 17 shows a modified arrangement of commutator-cylinder and brushes or plates for collecting the electric current. Fig. 18 shows still another modified arrangement of commutator-cylinder and brushes or plates for collecting the electric current. Fig. 19 represents an armature without grooves, wherein the diametrically-opposite sections with which said armature is wound have their first or last ends connected together and their remaining ends attached to diametrically-opposite segments. Fig. 20 represents modifications of grooved armatures in which the grooves are placed obliquely instead of at right angles to the circumferential length of the armature. Fig. 21 represents a grooved armature, in which the magnetic pole-pieces are presented to the armature on three sides of its magnetic axis.

The best forms of magneto-electric apparatus at present before the public are unnecessarily bulky, heavy, and expensive, and are more or less wasteful of mechanical power. By means of the improved apparatus described hereinafter a given result may be obtained with a less bulk and weight and at a smaller cost than with any other similar apparatus in use. The loss or waste of mechanical force is also reduced to a minimum. These important results are obtained by means of a new and improved form of armature, and a peculiar arrangement of commutators or conductors for collecting the electric current generated in the bobbins or sections of wire carried by the armature.

The armature A (shown in plan in Fig. 16) is of iron or other magnetic substance. It is in the form of a ring or endless band, and is attached to a hub, B, of suitable material, provided with any convenient number of spokes as shown. This hub is rigidly attached to the shaft C, which, when driven by the pulley D or by means of a crank, in case hand-power is used, causes the armature to revolve in its own plane. The armature, instead of having a uniform cross-section throughout its circumferential length, as is customary with annular armatures, is provided with grooves or depressions in a direction at right angles with its magnetic axis or length. These grooves are wound full of insulated copper wire in the manner shown. The sections of wire thus formed may be of any suitable number, according to the use for which the machine is designed, eight being shown in the drawings.

The advantage of winding the wire on the armature in grooves or depressions in the latter is twofold: First, the projecting portions of the armature between the sections of wire may be made to revolve very close to the poles N N and S S of the magnets, from which the magnetic force is derived, thus utilizing the inductive force of the latter to a much greater extent than is possible in the case of annular armatures ordinarily used, which are entirely covered with wire, and therefore cannot be brought very near the magnets; second, owing to the exposure of a very considerable portion of the armature to the atmosphere, the heat, which is always developed by the rapidly-succeeding magnetizations and demagnetizations of armatures in motion, is rapidly dissipated by radiation and convection. In the case of armatures entirely covered with wire the escape of heat is very slow, so that they must be run at a comparatively low rate of speed with corresponding effect in order to prevent injurious heating.

It is obvious that the depressions or grooves in the armature in which the wire is wound may extend entirely around its section, or may be made only on the outer side, parallel with the axis of rotation. In this last case the poles of the magnets would be presented to this part of the armature. It is equally obvious that the cross-section of the armature may be of other forms than the parallelogram shown.

The armature may be of a uniform ring or band of iron, or a bundle of iron wire or ribbon, or series of parallel disks with the iron projections between the sections of copper wire, fastened on by any suitable means, or it may be made of a single piece of soft cast-iron, which is the most practicable method.

In Fig. 10 diametrically-opposite sections have their first (or can have their last) ends joined together, and their remaining ends connected with two segments of metal of the commutator-cylinder E, which is carried by the shaft C, and is of insulating material.

The two metal segments are placed diametrically opposite each other on the cylinder, and are each of a length less than half the circumference of the latter, thus exposing the insulating-cylinder in two places diametrically opposite each other, and alternating with the metal segments. The two segments—say, $S^3$ and $S^7$—corresponding to sections 3 and 7 of wire, hold a position on the cylinder in advance of those of the preceding sections $S^2$ and $S^6$, to the same angular extent that the sections 3 and 7 in question are in advance of sections 2 and 6. (Sections 2 and 6 are not illustrated in the drawings; but they are situated respectively between sections 3 and 7, as sufficiently suggested in Fig. 10.) In this arrangement the number of segments is equal to the number of sections, each segment being connected with but one section. The first and last ends of each section can, however, be attached to two diametrically-opposite segments, the commutator-cylinder in that case being constructed with double the number of segments as in the former case, thus making the number of segments double the number of sections, as shown in Figs. 12 and 8.

Fig. 7 shows the commutator developed, showing the arrangement of metal segments on the same, and the manner in which they are connected with the sections of wire.

Each segment, S, is insulated from its neighbors, and has a wire soldered to its under side and extending under, but insulated from, any segments which may be in front of it. Evidently the segments belonging to any one section of wire occupy the same position on the cylinder circumferentially as those of the section diametrically opposite the given section, as shown in Fig. 8. Hence each pair of segments may be made common to two opposite sections of wire, thus making the number of segments the same as the number of sections, instead of double, as in the former case. This simplified arrangement is shown in Fig. 11. Thus the wires 1, 2, 3, &c., represent the different segments, and appear at equal distances around the cylinder. All the sections or bobbins of wire on the armature being wound in the same direction, one section will have its first and last end connected, respectively, with wires 2 and 6, while the opposite section will be similarly connected with 6 and 2.

Two metallic plates or brushes, F, Fig. 2, insulated from each other, press lightly upon the cylinder E at opposite points, so selected that, while each section of wire on the armature is passing from one neutral point to the other, the corresponding segments on the cylinder will be in contact with them. These plates or brushes collect the currents of electricity generated by the revolution of the armature, one being positive and the other negative. When the section of wire is passing the neutral points on the armature the plates F are in contact with the insulating material of the cylinder between the corresponding segments, thus cutting the section, which is at the time useless, out of the circuit altogether.

The necessity of thus insulating each section from the brushes or plates F during the time it is inactive becomes obvious when we consider that if this was not done the idle section would afford a passage for the current generated in the active sections and divert it from its proper channel. During the time a section or bobbin is passing from one neutral point of the armature to the next one, an electrical impulse, constant in direction but varying in electro-motive force, is induced in it. This electro-motive force, starting from nothing at the neutral point, quickly increases to nearly its maximum, and remains almost constant until the section is near the next neutral point, when it rapidly falls to zero as the neutral point is reached.

The insulating-spaces are made of such a length that a section or bobbin is cut out of the circuit, not only when it is at the neutral points, but also during the time when its electro-motive force is rising and falling at the beginning and end of an impulse. If the insulating-space is too short, so as to keep or bring a section in the circuit while its electro-motive force is low, then the current from the other sections, being of superior electro-motive force, will overcome this weak current and discharge a portion of itself (an amount expressed by the difference of the electro-motive forces) through this section. If the insulating-spaces are a little longer than necessary no material inconvenience results. A suitable length for practical purposes is easily determined experimentally.

It is found in practice that the neutral points of the armature in motion are considerably in advance of their theoretical position, this circumstance being doubtless due to the fact that some time is required to saturate any point of the armature with magnetism, so that it is really carried beyond the point of greatest magnetic intensity of the "field" before receiving its maximum charge.

It is necessary to adjust the commutator-cylinder on the revolving shaft of the machine with special reference to the neutral points of the armature when in motion, in order that its insulating-spaces may correspond with said neutral points. This adjustment is made experimentally as follows: The commutator-cylinder having been placed approximately in the proper position, the machine is started and the presence or absence of sparks at the points of contact between the brushes or plates F and commutator-cylinder is noted. If sparks occur the commutator-cylinder is turned slightly forward or backwark on its axis, as experiment may indicate, until the sparks nearly or quite disappear.

The presence of sparks when the commutator is even slightly out of its proper position is easily explained. If the break between a pair of segments and the brushes F occurs while the corresponding section of wire on the armature is still active, a spark is produced by the interruption of the current, while, if the break occurs too late, the section in question will have become neutral and then commenced to conduct the current from the active sections, and the interruption of this passage causes a spark in this instance.

If the commutator is much removed from its proper position in either direction, the sparks are so great as to very rapidly destroy both the commutator and the brushes, while the external current from the machine is correspondingly diminished.

It will be seen that with the arrangement above described, where the first and last ends of each of two diametrically-opposite sections are attached to two opposite segments, the intensity of the induced electric current will be that due to the length of wire in a single section only, while the quantity will be directly as the number of sections. By doubling the size of each bobbin and diminishing their number one-half a current of double the intensity and one-half the quantity of the former will be obtained. This effect can, however, be secured in another manner by connecting the first or last ends of the two opposite sections together, and joining the remaining ends only to two opposite segments, as illustrated in Fig. 10. This arrangement I find most convenient in practice.

It is obvious where I employ an armature either with or without grooves and wind that armature with the sections of wire, the wires of each section or pair of sections combined with the commutator, that these sections form, in fact, a series of separate and distinct bobbins or pairs of bobbins, that are not connected into a single or continuous bobbin.

The arrangement of the cylinder E with segments S may be replaced by another, as follows: The last end of one section and the first end of the succeeding one may be connected with a strip of metal attached to the cylinder E parallel with its axis. These metallic strips or conductors are equal in number to the sections of wire on the armature, and are insulated from each other. The plates F press upon the cylinder, in this case, at points corresponding to the neutral points of the armature, thus being at right angles with their position in the first arrangement. This plan, which is the one commonly used with annular armatures, gives fair results, but is subject to a serious disadvantage from which the first is free. The difficulty is this: The sections of wire, when at or near the neutral points of the armature, contribute little or no useful effect, but the current from the other sections must pass through these in order to reach the plates F, thus experiencing a considerable and entirely useless resistance, and, owing to the opposite directions of the currents through the active sections on opposite sides of the neutral points, these currents, by passing through the idle sections, tend strongly to produce consequent points in the armature where the neutral points should be, thus interfering seriously with the theoretical distribution of the armature's magnetism.

The first described arrangement of commutators on the cylinder E may be employed with marked advantage over the other form, in combination with annular armatures of the ordinary kind—*i. e.*, those not provided with grooves or depressions for the reception of the sections of wire.

In Fig. 17 the strips of the commutator-cylinder are arranged on the same in a direction parallel with its axis, and the current is taken off by a series of plates or brushes equal in number to the strips of metal, said plates or brushes attached to two curved plates arranged diametrically opposite each other.

In Fig. 18 the segments of the commutator-cylinder are arranged on the same in pairs, placed diametrically opposite each other, each pair occupying a different position longitudinally, but the same position circumferentially, and the current is taken off by an arrangement of brushes or plates similar to that shown in Fig. 17, each pair of oppositely-placed brushes or plates, however, necessarily occupying a different position longitudinally with regard to the cylinder.

The two arrangements just described, and illustrated in Figs. 17 and 18, may be substituted for the arrangement shown in Fig. 2 of the drawings.

The commutator-cylinder may be turned ninety degrees on its axis, while the armature remains stationary, so that the sections would stand at right angles with regard to the segments. The position of the brushes would have to be changed accordingly in that case.

The electro-magnets H are excited by the whole or a portion of the electric current derived from the revolving armature, as is usual in apparatus of this kind, the novel feature of this part of the machine consisting of the manner in which the magnetic poles are presented to the armature. This arrangement is such that a very large proportion of the entire surface of the armature is constantly presented to the poles of the magnets, thus securing uniformity of magnetization as well as maximum amount.

The iron segments N S (shown in Fig. 14) constitute the poles of the magnets H, and are arranged on both sides of the armature, as shown in Fig. 1, thus securing the advantages enumerated above.

Obviously the pieces N N or S S may be connected together at their outer edges, thus forming one piece and inclosing the armature still more. This arrangement is, in fact, adopted by the inventor for small machines, inasmuch as one electro-magnet may thus be used instead of two, the effect being the same, only less in degree, while the construction of the machine is simplified. Of course, permanent steel magnets may be employed in these machines instead of electro-magnets, and this substitution is advisable in small hand-machines.

The arrangement of magnetic poles above described may also be applied to annular armatures having no depressions or grooves, but consisting of a plain uniform ring of iron or bundle of iron wire with its greatest length of cross-section parallel with its plane of rotation. This form of apparatus gives excellent results as compared with old forms.

What I claim as my invention, and desire to secure by Letters Patent, is—

1. In a magneto-electric machine, an armature of iron or other magnetic substance in the form of a ring or endless band, of any convenient form of cross-section, provided with a series of grooves or depressions on the sides only at right angles with the axis of rotation of the armature, and with its circumferential length or magnetic axis for the reception of the insulated wire with which armatures are wound, substantially as described.

2. In a magneto-electric machine, an armature of iron or other magnetic substance in the form of a ring or endless band of any convenient form of cross-section, provided with a series of grooves or depressions upon its sides only at right angles with the axis of rotation of the armature and with its circumferential length or magnetic axis, with sections or bobbins of wire wound in said grooves around the armature, substantially as described.

3. In a magneto-electric machine, an armature of iron or other magnetic substance in the form of a ring or endless band of any convenient form of cross-section, provided with a series of grooves or depressions at right angles with its magnetic axis, and with sections or bobbins of wire wound in said grooves around the armature, the first or last ends of diametrically-opposite sections joined together, and their remaining ends to diametrically-opposite commutator-segments, substantially as described.

4. In a magneto-electric machine, the bobbins or sections of wire upon the armature, in combination with a commutator (or series of conductors) so constructed and arranged with relation to each other that the said bobbins or sections are open-circuited at and for a suitable period immediately before and after the time when the current in said bobbins or sections is about to reverse—that is, at a time when said bobbins are passing a neutral point—the remaining bobbins or sections upon the armature being maintained in closed circuit.

5. In a magneto-electric machine, the combination of the following instrumentalities, to wit: an armature carrying bobbins or sections of insulated conductor, a commutator or series of conductors, and brushes F, or their equivalent, all arranged and electrically connected so that each of said armature bobbins or sections, while passing a neutral point, (and for a suitable time before and after,) shall be open-circuited, the remaining bobbins or sections upon the armature being maintained in closed circuit.

6. In a magneto electric machine, a commutator-cylinder consisting of a cylinder of insulating material provided with metal strips or segments constituting a series of commutators or conductors arranged in pairs, each of said pairs having its members diametrically opposite each other, and each pair occupying a different position longitudinally on the cylinder from any other pair, their ends separated a sufficient distance to prevent the current of an active bobbin or bobbins from escaping through an idle bobbin or bobbins while the latter are at or near the neutral or current-reversing points, substantially as described.

7. As an article of manufacture, an electric-current-generating machine constructed to have the bobbins or sections of wire upon its armature that are passing a neutral or current-reversing point open-circuited, the remaining bobbins or sections being maintained in closed circuit.

8. As an article of manufacture, an electric-current-generating machine constructed to have the bobbins or sections of wire upon its armature successively open-circuited as they pass neutral or current-reversing points.

9. In a magneto-electric machine, an armature of iron or other magnetic substance in the form of a ring or endless band, with or without grooves, and provided with bobbins or sections of wire, in combination with a commutator and brushes or conductors, the latter so placed with regard to the strips or segments of said commutator and their respective bobbins on said armature as to take off the current continuously, except when the said bobbins or sections of wire are at and near the neutral points of the armature, substantially as described.

10. In a magneto-electric machine, an armature of iron or other magnetic substance in the form of a ring or endless band of any convenient form of cross-section, and provided with sections or bobbins of wire wound around the armature at right angles to its circumferential axis, one end of the wire of each bobbin being connected to the diametrically-opposite segment of the commutator-cylinder through the coils of the diametrically-opposite section, substantially as described.

11. In a magneto-electric machine, a grooved armature provided with sections of wire, the first or last ends of diametrically-opposite sections connected together, in combination with the commutator-cylinder E, to diametrically-opposite segments of which the remaining ends of said sections are attached, substantially as described.

12. In a magneto-electric machine, an armature of iron or other magnetic substance in the form of a ring or endless band, of any convenient form of cross-section, and provided with sections or bobbins of wire wound around the armature at right angles to its circumferential axis, the ends of each section connected to diametrically-opposite segments of the commutator-cylinder, substantially as described.

13. In a magneto-electric machine, a grooved armature of iron or other magnetic substance of any convenient form of cross-section, provided with sections of insulated wire, in combination with the magnetic pole-pieces N N and S S, so arranged as to present a magnetic surface simultaneously to two sides of its magnetic axis, substantially as described.

In testimony whereof I have signed my name to this specification in the presence of two subscribing witnesses.

CHARLES F. BRUSH.

Witnesses:
L. L. LEGGETT,
JNO. CROWELL, Jr.